US012331897B2

(12) United States Patent
Wei

(10) Patent No.: US 12,331,897 B2
(45) Date of Patent: Jun. 17, 2025

(54) VEHICLE LIGHT

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/906,838

(22) Filed: Oct. 4, 2024

(65) Prior Publication Data

US 2025/0164090 A1 May 22, 2025

Related U.S. Application Data

(63) Continuation-in-part of application No. 18/512,516, filed on Nov. 17, 2023, now abandoned.

(51) Int. Cl.
*F21S 43/31* (2018.01)
*F21S 41/143* (2018.01)
(Continued)

(52) U.S. Cl.
CPC ........... *F21S 41/192* (2018.01); *F21S 41/143* (2018.01); *F21S 41/153* (2018.01); *F21S 41/2805* (2024.05); *F21S 41/29* (2018.01); *F21S 41/36* (2018.01); *F21S 43/14* (2018.01); *F21S 43/19* (2018.01); *F21S 43/265* (2024.05); *F21S 43/27* (2018.01); *F21S 43/31* (2018.01)

(58) Field of Classification Search
CPC .... F21S 41/2805; F21S 43/265; F21S 41/143; F21S 41/153; F21S 41/29; F21S 43/14; F21S 43/19; F21S 41/192; F21S 43/31; F21S 41/24; F21S 41/285; F21Y 2115/10
See application file for complete search history.

(56) References Cited

U.S. PATENT DOCUMENTS

| | | | | |
|---|---|---|---|---|
| 3,539,801 A | | 11/1970 | Bobrick | |
| 5,580,156 A | * | 12/1996 | Suzuki | F21V 9/08 116/63 P |

(Continued)

FOREIGN PATENT DOCUMENTS

| | | | |
|---|---|---|---|
| CN | 103065486 A | | 4/2013 |

OTHER PUBLICATIONS

Search, English translation of CN 103065486 A (Year: 2013).

*Primary Examiner* — Omar Rojas Cadima
(74) *Attorney, Agent, or Firm* — Muncy, Geissler, Olds & Lowe, P.C.

(57) ABSTRACT

A vehicle light is provided, including: a housing, a first lighting module, a second lighting module and a light guiding member. The housing defines a receiving space. The first lighting module includes at least one first lighting member. The second lighting module includes a light-permeable substrate and a plurality of second lighting members disposed on the light-permeable substrate. The light guiding member is located between the at least one first lighting member and the light-permeable substrate. The first lighting module and the second lighting module are disposed within the receiving space and at least partially overlapped with each other in a light emitting direction of the vehicle light, and at least a portion of a light emitted from the at least one first lighting member is projected out of the housing through the light-permeable substrate.

10 Claims, 7 Drawing Sheets

(51) Int. Cl.

| | |
|---|---|
| ***F21S 41/153*** | (2018.01) |
| ***F21S 41/19*** | (2018.01) |
| ***F21S 41/20*** | (2018.01) |
| ***F21S 41/29*** | (2018.01) |
| ***F21S 41/36*** | (2018.01) |
| ***F21S 43/14*** | (2018.01) |
| ***F21S 43/19*** | (2018.01) |
| ***F21S 43/20*** | (2018.01) |
| ***F21S 43/27*** | (2018.01) |

(56) References Cited

U.S. PATENT DOCUMENTS

| | | | |
|---|---|---|---|
| 6,953,264 | B2 * | 10/2005 | Ter-Hovhannisian ........................ F21S 43/40 362/241 |
| 10,088,122 | B1 | 10/2018 | Wei |
| 2001/0038532 | A1 * | 11/2001 | Harbers ............ G02F 1/133621 362/616 |
| 2004/0223328 | A1 | 11/2004 | Lee et al. |
| 2005/0281025 | A1 * | 12/2005 | Coushaine ............. G02B 6/425 362/227 |
| 2017/0241605 | A1 | 8/2017 | Yamamoto |

* cited by examiner

VEHICLE LIGHT

The present invention is a CIP of application Ser. No. 18/512,516, filed Nov. 17, 2023, the entire contents of which are hereby incorporated by reference.

BACKGROUND OF THE INVENTION

Field of the Invention

Description of the Prior Art

A conventional vehicle light, such as headlight, brake light or daytime running light, includes a lampshade, a light source disposed inside the lampshade and a reflective structure surrounding the light source. The reflective structure is used to change a path of the light emitted from the light source so as to achieve expected lighting effect. However, the conventional vehicle light generates different lighting effects only by changing a number, distribution, brightness of the light source or the configuration of the reflective structure, which provides insufficient variability.

The present invention is, therefore, arisen to obviate or at least mitigate the above-mentioned disadvantages.

SUMMARY OF THE INVENTION

The main object of the present invention is to provide a vehicle light, which has a simple structure and provides special lighting effect.

To achieve the above and other objects, the present invention provides a vehicle light, including: a housing, a first lighting module, a second lighting module and a light guiding member. The housing defines a receiving space. The first lighting module includes at least one first lighting member. The second lighting module includes a light-permeable substrate and a plurality of second lighting members disposed on the light-permeable substrate. The light guiding member is located between the at least one first lighting member and the light-permeable substrate. The first lighting module and the second lighting module are at least partially overlapped with each other in a light emitting direction of the vehicle light and disposed within the receiving space, and at least a portion of a light emitted from the at least one first lighting member is projected out of the housing through the light-permeable substrate. The light guiding member includes at least one light guiding portion, and each of the at least one light guiding portion includes at least one through hole and at least one reflecting surface around the at least one through hole. The housing includes a basement and a light-transmitting cover detachably disposed on the basement, and light emitted from the at least one first lighting member and the plurality of second lighting members is projected out of the housing through the light-transmitting cover. The basement includes a bottom wall, a side wall around the bottom wall and a first circumferential wall protrudingly disposed between the bottom wall and the side wall. One of the first circumferential wall and the light guiding member has a plurality of first positioning recessed portions disposed thereon, and the other of the first circumferential wall and the light guiding member has a plurality of first positioning protruding portions engaged within the plurality of first positioning recessed portions.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
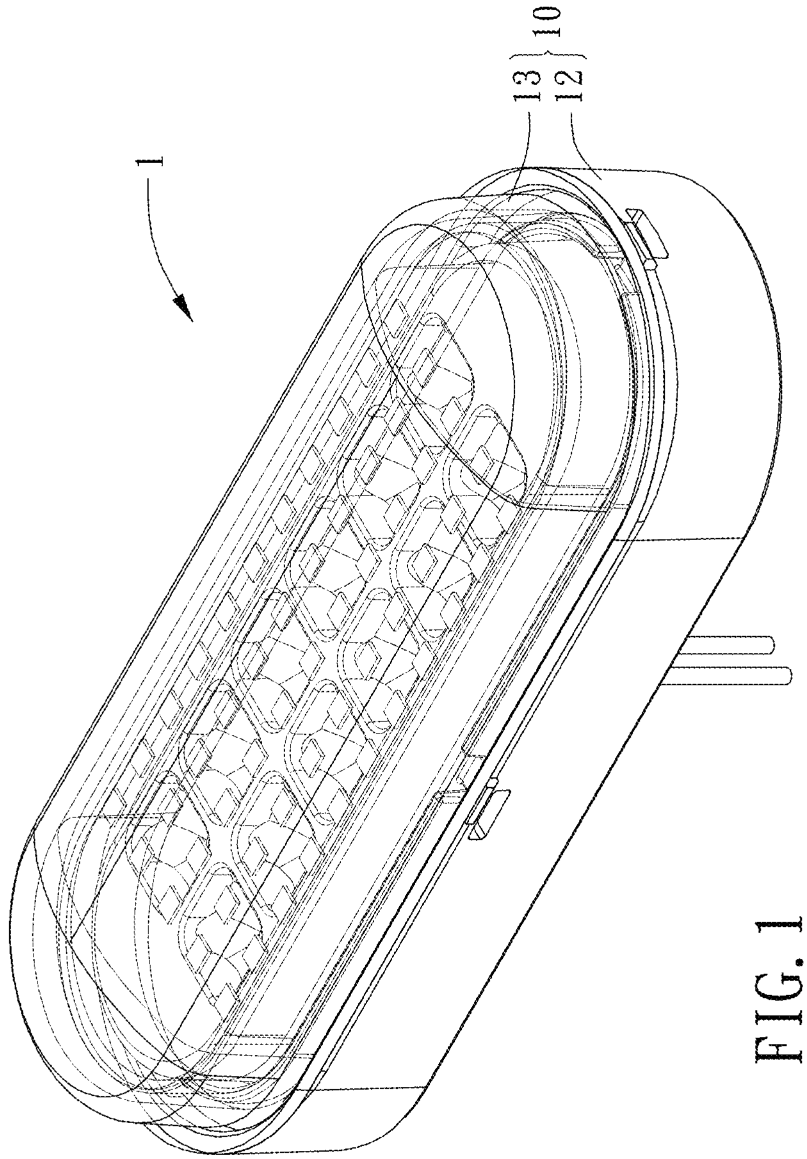
FIG. 1 is a stereogram of a first preferable embodiment of the present invention.
Figure 2:
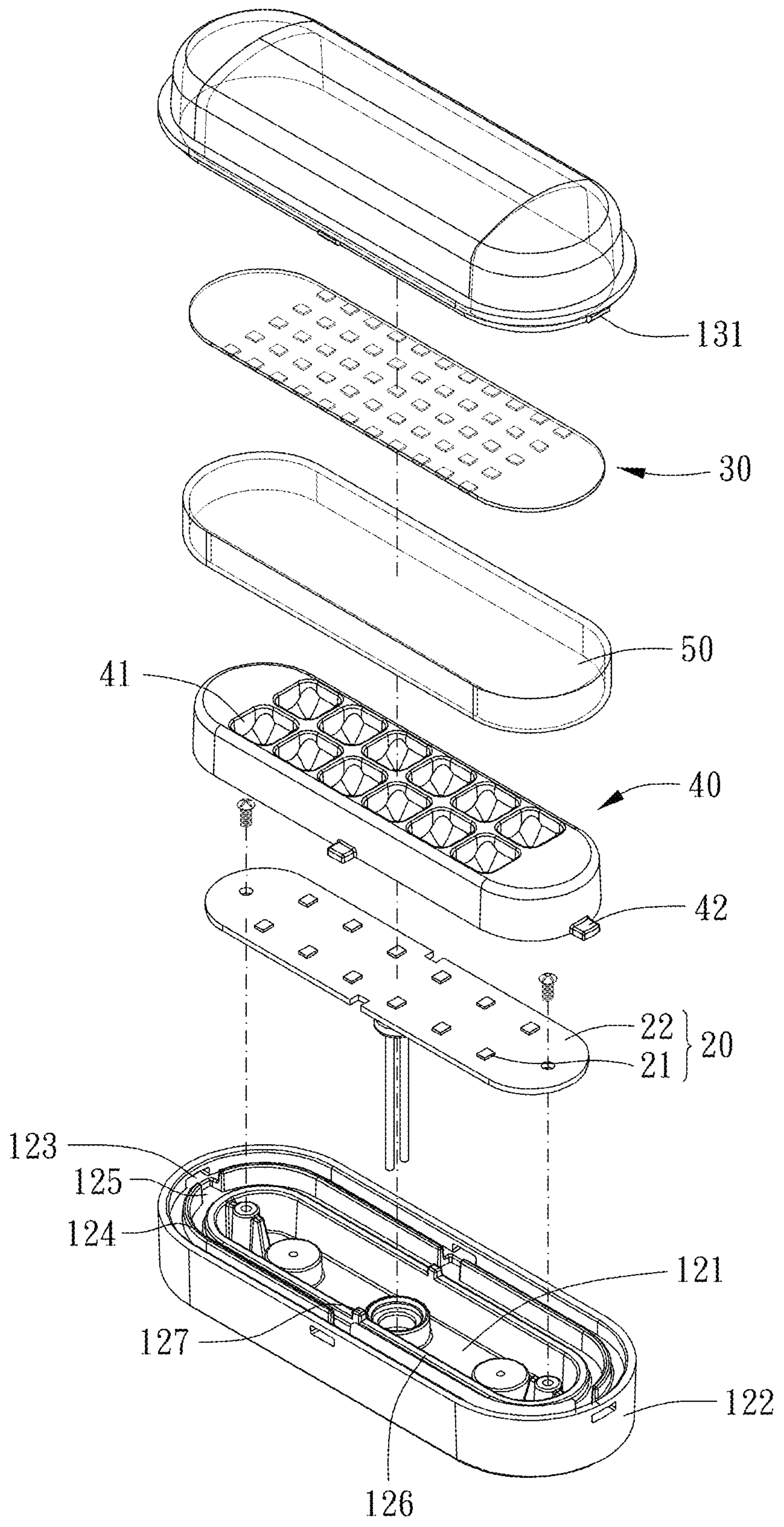
FIG. 2 is a breakdown drawing of the first preferable embodiment of the present invention.
Figure 3:
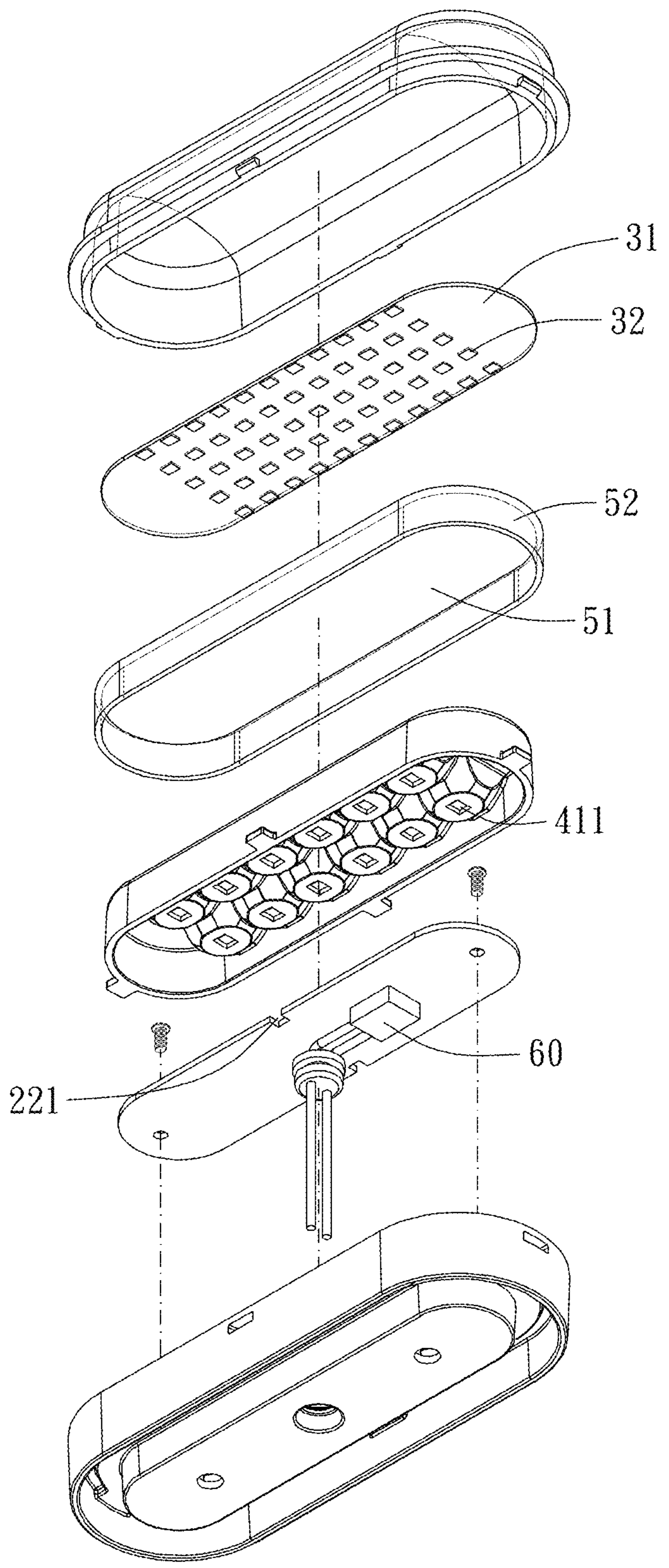
FIG. 3 is a breakdown drawing of the first preferable embodiment of the present invention as view in another direction.
Figure 4:
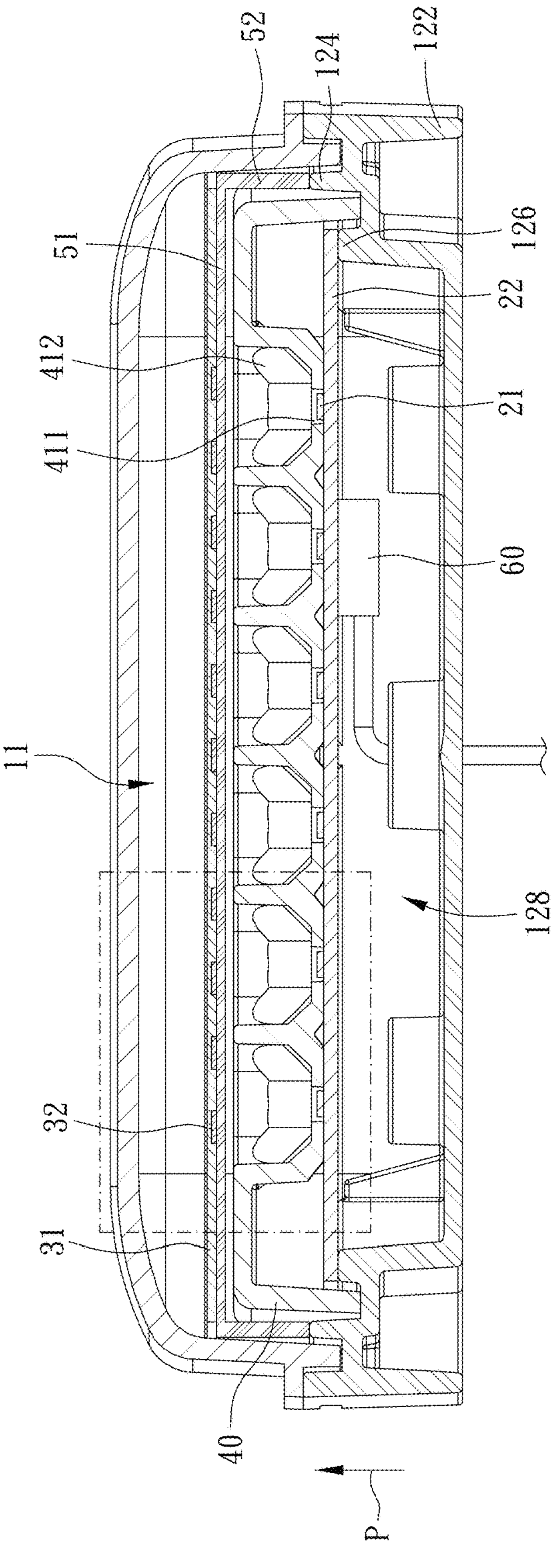
FIG. 4 is a cross-sectional view of the first preferable embodiment of the present invention.

Please refer to FIGS. 1 to 5 for a first preferable embodiment of the present invention. A vehicle light 1 of the present invention includes a housing 10, a first lighting module 20 and a second lighting module 30.

The housing 10 defines a receiving space 11. The first lighting module 20 includes at least one first lighting member 21. The second lighting module 30 includes a light-permeable substrate 31 and a plurality of second lighting members 32 disposed on the light-permeable substrate 31. The first lighting module 20 and the second lighting module 30 are at least partially overlapped with each other in a light emitting direction P of the vehicle light 1 and disposed within the receiving space 11, and at least a portion of a light emitted from the at least one first lighting member 21 is projected out of the housing 10 through the light-permeable substrate 31. Therefore, the vehicle light 1 has a simple structure and provides special lighting effect.

The housing 10 includes a basement 12 and a light-transmitting cover 13 detachably disposed on the basement 12, and the light emitted from the at least one first lighting member 21 and the plurality of second lighting members 32 is projected out of the housing 10 through the light-transmitting cover 13. Specifically, the basement 12 includes a bottom wall 121 and a side wall 122 around the bottom wall 121, the side wall 122 has a plurality of first engaging portions 123 disposed thereon, and the light-transmitting cover 13 has a plurality of second engaging portions 131 engaged with the plurality of first engaging portions 123. Each of the plurality of first engaging portions 123 and each of the plurality of second engaging portions 131 are respectively an engaging projection and an engaging recession, which has a simple structure and is easy to assemble. In other embodiments, the light-transmitting cover may have a plurality of lens structures disposed thereon so as to provide special lighting effect.

Figure 5:
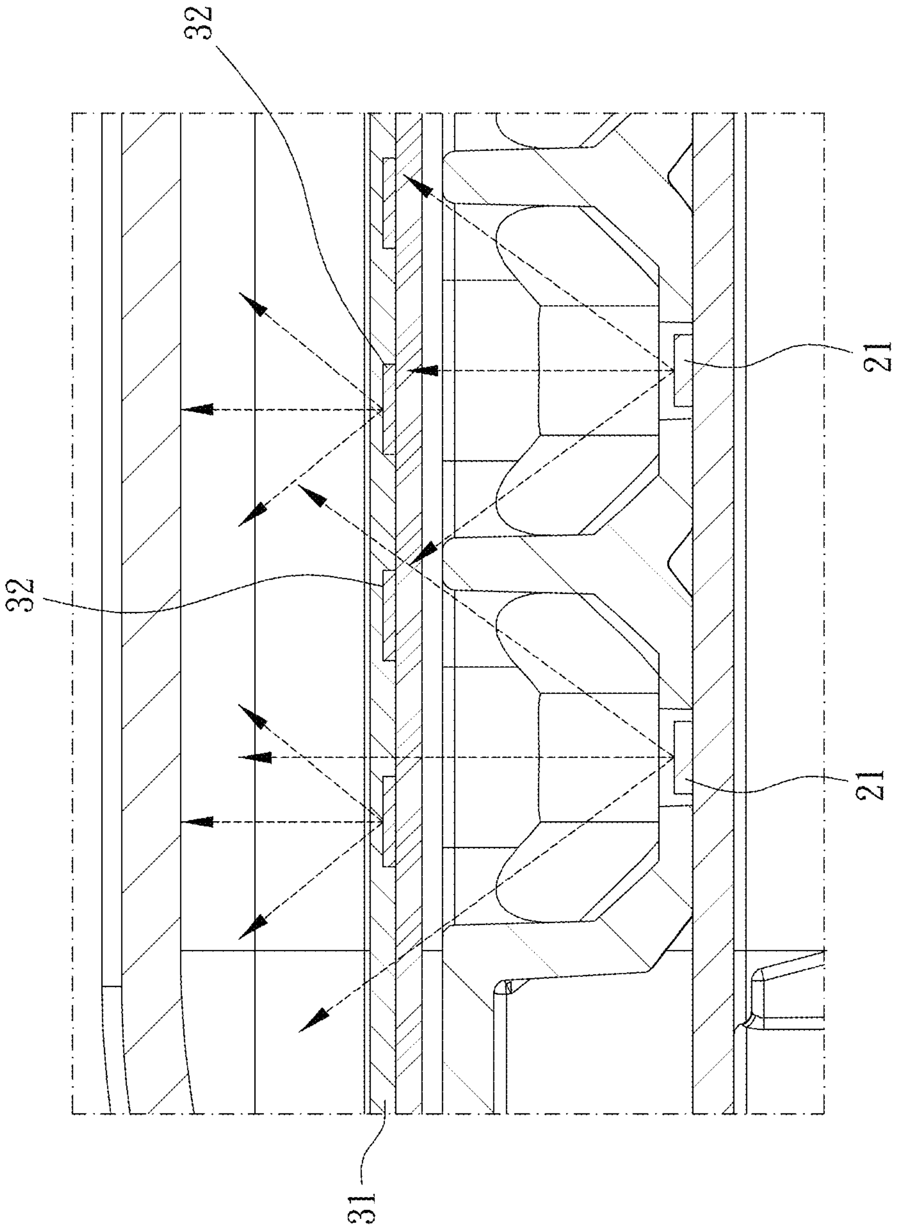
FIG. 5 is a partial enlargement of FIG. 4.

The vehicle light 1 further includes a light guiding member 40 located between the at least one first lighting member 21 and the light-permeable substrate 31. The light guiding member 40 includes at least one light guiding portion 41, and each of the at least one light guiding portion 41 includes at least one through hole 411 and at least one reflecting surface 412 around the at least one through hole 411 so as to guide the light emitted from the at least one first lighting member 21 to be transmitted toward the light-permeable substrate 31 through the at least one through hole 411. In this embodiment, the first lighting module 20 further includes a circuit board 22, and the at least one first lighting member 21 is disposed on the circuit board 22. Each of the at least one first lighting member 21 is covered by the light-permeable substrate 31 in the light emitting direction P, which ensures the light emitted from the at least one first lighting member 21 to be projected outwardly through the light-permeable substrate 31. The first lighting module 20 preferably includes a plurality of said first lighting members 21, and each of the plurality of said first lighting members 21 may be a LED. The light guiding member 40 includes a plurality of said light guiding portions 41, each of the plurality of said light guiding portions 41 corresponds to one of the plurality of said first lighting members 21 and includes one of said through hole 411 and a plurality of said reflecting surfaces 412 around the said through hole 411, and the plurality of said reflecting surfaces 412 are connected with one another at an angle so as to have good light focusing and light guiding effects. Preferably, in the light emitting direction P, each of the plurality of light guiding portions 41 corresponds to at least two of the plurality of second lighting members 32 so that the light emitted from the plurality of said first lighting members 21 can pass through adjacent two of the plurality of second lighting members 32, as shown in FIG. 5, which effectively increases brightness and light uniformity and reduces dark bands. In other embodiments, the light guiding member may have a single light guiding portion; each said reflecting surface may be an arcuated concave surface extending around one said through hole.

Moreover, the basement 12 further includes a first circumferential wall 124 protrudingly disposed between the bottom wall 121 and the side wall 122. One of the first circumferential wall 124 and the light guiding member 40 has a plurality of first positioning recessed portions 125 disposed thereon, and the other of the first circumferential wall 124 and the light guiding member 40 has a plurality of first positioning protruding portions 42 engaged within the plurality of first positioning recessed portions 125 so as to avoid relative movement and be easy to assemble. The basement 12 further includes a second circumferential wall 126 located at an inner side of the first circumferential wall 124. One of the second circumferential wall 126 and the circuit board 22 has a plurality of second positioning recessed portions 221 disposed thereon, and the other of the second circumferential wall 126 and the circuit board 22 has a plurality of second positioning protruding portions 127 engaged within the plurality of second positioning recessed portions 221 so as to restrict the circuit board 22. Preferably, the circuit board 22 may be mounted to the basement 12 by at least one fastener so as to have good assembling stability.

The plurality of second lighting members 32 are embedded within the light-permeable substrate 31, and at least a portion of the light-permeable substrate 31 is flexible and deformable, which can be deformed according to a shape of the vehicle light 1 and has a wide range of applications. Preferably, the vehicle light 1 further includes at least one light-permeable board 50 disposed on a side of the light-permeable substrate 31, and a hardness of the at least one light-permeable board 50 is larger than a hardness of the light-permeable substrate 31 so as to support the light-permeable substrate 31 and be convenient to be positioned and assembled. In this embodiment, the light-permeable substrate 31 and the plurality of second lighting members 32 are disposed on a side of the at least one light-permeable board 50 close to the light-transmitting cover 13, which gives prominence to the three-dimensional effect of the light-permeable substrate 31. In addition, a shape of the light-permeable substrate 31 is adjustable according to a shape of the at least one light-permeable board 50. The light-permeable board 50 includes a light transmission surface 51 and a circumferential flange 52 around the light transmission surface 51, and the circumferential flange 52 is abutted against the first circumferential wall 124. Therefore, the light-permeable board 50 is arranged between the light-transmitting cover 13 and the first circumferential wall 124 so as to have good positioning effect.

Figure 6:
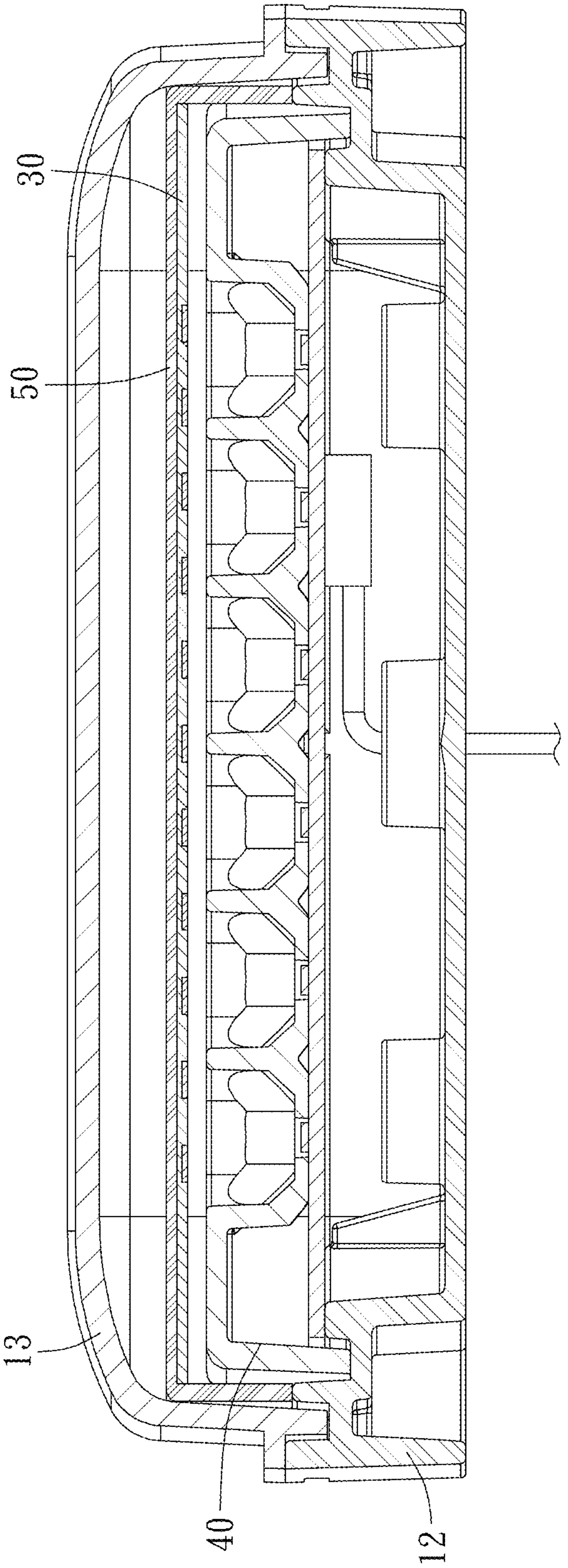
FIG. 6 is a cross-sectional view of a second preferable embodiment of the present invention.
Figure 7:
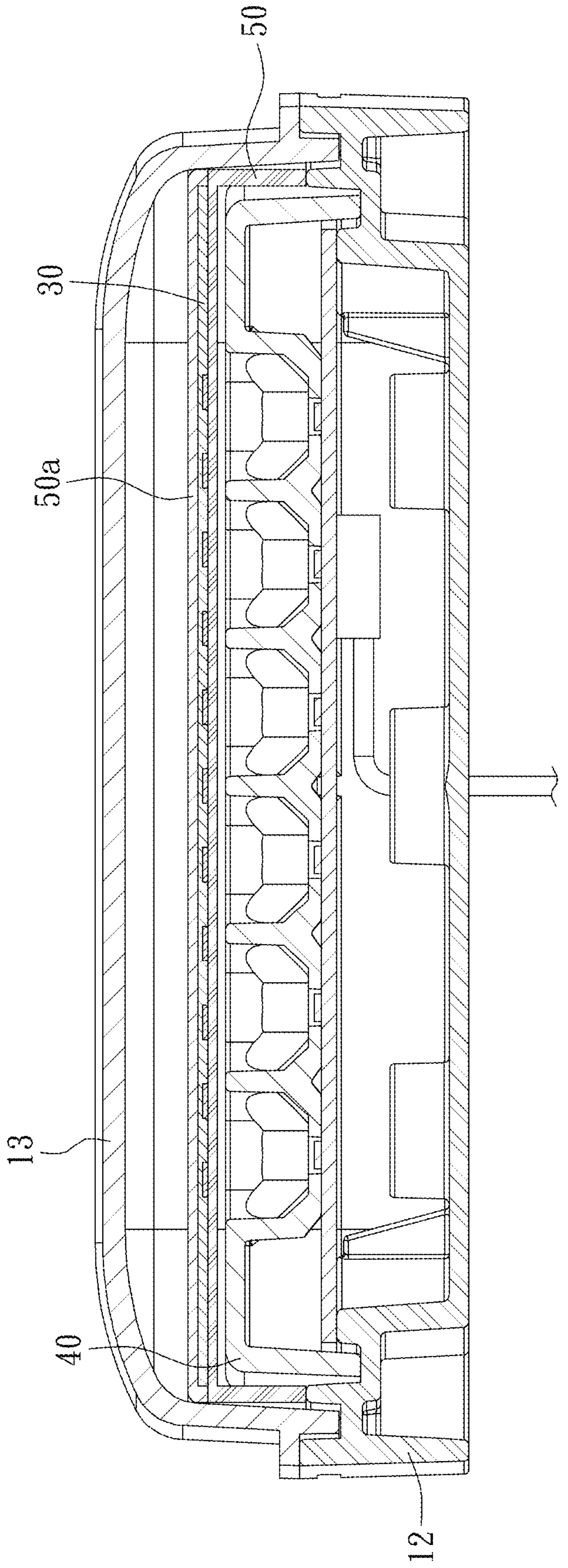
FIG. 7 is a cross-sectional view of a third preferable embodiment of the present invention.

In other embodiments, the light-permeable substrate 31 and the plurality of second lighting members 32 may be disposed between the at least one light-permeable board 50 and the light guiding member 40, as a second preferable embodiment of the present invention shown in FIG. 6. Therefore, the light emit from the plurality of second lighting members 32 is passed through the at least one light-permeable board 50 to produce a crystal-clear lighting effect. The light-permeable substrate 31 and the plurality of second lighting members 32 may be disposed between two said light-permeable boards 50, 50*a*, as a third preferable embodiment of the present invention shown in FIG. 7. When the two said light-permeable boards 50, 50*a* or the housing 10 have a larger curvature, the light-permeable substrate 31 and the plurality of second lighting members 32 are stably restricted to have expected arrangements.

Preferably, the plurality of said first lighting members 21 and the plurality of second lighting members 32 are respectively arranged in matrix, and a distribution density of the plurality of second lighting members 32 is larger than a distribution density of the plurality of said first lighting members 21. The plurality of said first lighting members 21 and the plurality of second lighting members 32 may have different brightness, colors, or the like, and the plurality of said first lighting members 21 and the plurality of second lighting members 32 may be lit up asynchronously so as to provide various visual changes.

Specifically, the vehicle light 1 further includes a control unit 60 electrically connected with the first lighting module 20 and the second lighting module 30, and lighting status of the plurality of said first lighting members 21 and the plurality of second lighting members 32 are controllable by the control unit 60. Changes in the lighting status may include turning on and off of said lighting members, changes in light and shade, changes in light color or changes in flicker frequency, etc. For example, the control unit 60 may be configured to be connected with a brake system of a vehicle, and the first lighting module 20 is served as a brake light of the vehicle and is lit when the brake system is actuated; the control unit 60 may control the first lighting module 20 to emit light when the vehicle is started, and the lighting module 20 is served as a daytime running light; the control unit 60 may be connected with a control system of the vehicle so as to control the first lighting module 20 to serve as a headlight or a fog lamp of the vehicle. Preferably, the control unit 60 controls the plurality of second lighting members 32 to display at least one of graphics, text, numbers and dynamic images, which is changeable according to different requirements so as to display expected lighting effect, provide special decorative effect and serve as a reminder. When the control unit 60 controls at least a portion of the plurality of said first lighting members 21 to emit light, an average brightness of the plurality of said first lighting members 21 is larger than an average brightness of the plurality of second lighting members 32. Therefore, the plurality of said first lighting members 21 and the plurality of second lighting members 32 are arranged front and back in the light emitting direction P to operate in coordination so as to produce special visual effect and various images.

Specifically, the second circumferential wall 126 and the bottom wall 121 define a receiving groove 128 therebetween, and at least a portion of the control unit 60 is located within the receiving groove 128. Cables of the vehicle light 1 connected with the control unit 60 may be arranged within the receiving space 11, which is convenient to assemble and provides good appearance.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle light, including:

a housing, defining a receiving space;

a first lighting module, including at least one first lighting member;

a second lighting module, including a light-permeable substrate and a plurality of second lighting members disposed on the light-permeable substrate; and a light guiding member, located between the at least one first lighting member and the light-permeable substrate;

wherein the first lighting module and the second lighting module are at least partially overlapped with each other in a light emitting direction of the vehicle light and disposed within the receiving space, and at least a portion of a light emitted from the at least one first lighting member is projected out of the housing through the light-permeable substrate;

wherein the light guiding member includes at least one light guiding portion, and each of the at least one light guiding portion includes at least one through hole and at least one reflecting surface around the at least one through hole;

wherein the housing includes a basement and a light-transmitting cover detachably disposed on the basement, light emitted from the at least one first lighting member and the plurality of second lighting members is projected out of the housing through the light-transmitting cover; the basement includes a bottom wall, a side wall around the bottom wall and a first circumferential wall protrudingly disposed between the bottom wall and the side wall, one of the first circumferential wall and the light guiding member has a plurality of first positioning recessed portions disposed thereon, and the other of the first circumferential wall and the light guiding member has a plurality of first positioning protruding portions engaged within the plurality of first positioning recessed portions.

2. The vehicle light of claim 1, wherein the first lighting module includes a plurality of said first lighting members, the plurality of said first lighting members and the plurality of second lighting members are respectively arranged in matrix, and a distribution density of the plurality of second lighting members is larger than a distribution density of the plurality of said first lighting members.

3. The vehicle light of claim 2, wherein the plurality of second lighting members are embedded within the light-permeable substrate, and at least a portion of the light-permeable substrate is flexible and deformable; the vehicle light further includes at least one light-permeable board disposed on a side of the light-permeable substrate, a hardness of the at least one light-permeable board is larger than a hardness of the light-permeable substrate; the light guiding member includes a plurality of said light guiding portions, each of the plurality of said light guiding portions corresponds to one said first lighting member and includes one said through hole and a plurality of said reflecting surfaces around the through hole, and the plurality of said reflecting surfaces are connected with one another at an angle; the first lighting module further includes a circuit board, the plurality of said first lighting members are disposed on the circuit board, and each of the plurality of said first lighting members is covered by the light-permeable substrate in the light emitting direction; the vehicle light further includes a control unit electrically connected with the first lighting module and the second lighting module, lighting status of the plurality of said first lighting members and the plurality of second lighting members are controllable by the control unit; the control unit controls the plurality of second lighting members to display at least one of graphics, text, numbers and dynamic images; when the control unit controls at least a portion of the plurality of said first lighting members to emit light, an average brightness of the plurality of said first lighting members is larger than an average brightness of the plurality of second lighting members; the side wall has a plurality of first engaging portions disposed thereon, the light-transmitting cover has a plurality of second engaging portions engaged with the plurality of first engaging portions; the basement further includes a second circumferential wall located at an inner side of the first circumferential wall, one of the second circumferential wall and the circuit board has a plurality of second positioning recessed portions disposed thereon, the other of the second circumferential wall and the circuit board has a plurality of second positioning protruding portions engaged within the plurality of second positioning recessed portions; the second circumferential wall and the bottom wall define a receiving groove therebetween, at least a portion of the control unit is located within the receiving groove; and the light-permeable board includes a light transmission surface and a circumferential flange around the light transmission surface, the circumferential flange is abutted against the first circumferential wall.

4. The vehicle light of claim 1, further including at least one light-permeable board disposed on a side of the light-permeable substrate, wherein a hardness of the at least one light-permeable board is larger than a hardness of the light-permeable substrate.

5. The vehicle light of claim 4, wherein the light-permeable board includes a light transmission surface and a circumferential flange disposed around the light transmission surface, and the circumferential flange is abutted against the housing.

6. The vehicle light of claim 1, wherein the first lighting module further includes a circuit board, the at least one first lighting member is disposed on the circuit board, and each of the at least one first lighting member is covered by the light-permeable substrate in the light emitting direction.

7. The vehicle light of claim 1, further including a control unit electrically connected with the first lighting module and the second lighting module, wherein lighting status of the at least one first lighting member and the plurality of second lighting members are controllable by the control unit.

8. The vehicle light of claim 7, wherein the control unit controls the plurality of second lighting members to display at least one of graphics, text, numbers and dynamic images.

9. The vehicle light of claim 7, wherein when the control unit controls at least a portion of the at least one first lighting member to emit light, an average brightness of the at least one first lighting member is larger than an average brightness of the plurality of second lighting members.

10. The vehicle light of claim 1, wherein the plurality of second lighting members are embedded within the light-permeable substrate, and at least a portion of the light-permeable substrate is flexible and deformable.

* * * * *